United States Patent
Ishikawa (10) Patent No.: US 9,299,997 B2
(45) Date of Patent: Mar. 29, 2016

(54) FUEL CELL SYSTEM AND METHOD FOR CONTROLLING FUEL CELL SYSTEM

(75) Inventor: Yuji Ishikawa, Nukata-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 283 days.

(21) Appl. No.: 14/126,054

(22) PCT Filed: Jun. 17, 2011

(86) PCT No.: PCT/JP2011/063898
§ 371 (c)(1),
(2), (4) Date: Dec. 13, 2013

(87) PCT Pub. No.: WO2012/172678
PCT Pub. Date: Dec. 20, 2012

(65) Prior Publication Data
US 2014/0134508 A1  May 15, 2014

(51) Int. Cl.
*H01M 8/04* (2006.01)
*H01M 8/10* (2006.01)

(52) U.S. Cl.
CPC ........ *H01M 8/04104* (2013.01); *H01M 8/0432* (2013.01); *H01M 8/04179* (2013.01); *H01M 8/04253* (2013.01); *H01M 8/04395* (2013.01); *H01M 8/04619* (2013.01); *H01M 8/04753* (2013.01); *H01M 8/04783* (2013.01); *H01M 2008/1095* (2013.01); *Y02E 60/50* (2013.01)

(58) Field of Classification Search
USPC .......................................................... 429/446
See application file for complete search history.

(56) References Cited

U.S. PATENT DOCUMENTS

| 6,117,579 | A | 9/2000 | Gyoten et al. |
| 2005/0053809 | A1 | 3/2005 | Hayashi et al. |
| 2006/0029847 | A1 | 2/2006 | Yumita et al. |
| 2009/0136791 | A1 | 5/2009 | Ogawa et al. |
| 2010/0196743 | A1 | 8/2010 | Cho et al. |

FOREIGN PATENT DOCUMENTS

| JP | 10-326622 A | 12/1998 |
| JP | 2004-342473 A | 12/2004 |
| JP | 2005-044795 A | 2/2005 |
| JP | 2006-032171 A | 2/2006 |
| JP | 2006-147166 A | 6/2006 |
| JP | 2009-129764 A | 6/2009 |

*Primary Examiner* — Tracy Dove
(74) *Attorney, Agent, or Firm* — Kenyon & Kenyon LLP (57) ABSTRACT

To improve an output of a fuel cell and power generation efficiency by enhancing drainage of the fuel cell upon actuation below freezing temperature. In a fuel cell system that generates power by supplying fuel gas and oxidant gas, the output of the fuel cell is measured when a temperature of the fuel cell after the actuation below freezing temperature exceeds 0 degree, and if a value of the output is equal to or less than a reference output value, pressure pulsation is applied to a cathode electrode to drain water built up in the fuel cell.

6 Claims, 6 Drawing Sheets

FUEL CELL SYSTEM AND METHOD FOR CONTROLLING FUEL CELL SYSTEM

CROSS REFERENCE TO RELATED APPLICATION

This is a national phase application based on the PCT International Patent Application No. PCT/JP2011/063898 filed on Jun. 17, 2011, the entire contents of which are incorporated herein by reference.

TECHNICAL FIELD

The Present invention relates to a fuel cell system including a fuel cell stack that is supplied with reactant gas to generate electricity and a method for controlling the fuel cell system.

BACKGROUND ART

A fuel cell includes a fuel cell stack made of a lamination body of a plurality of fuel cells (i.e., a plurality of single cells). Each of the plurality of single cells has a membrane-electrode assembly including an anode electrode on one surface of an electrolyte membrane and a cathode electrode on the other surface of the electrolyte membrane. The membrane-electrode assembly is sandwiched between a gas flow channel layer and a separator. The anode electrode is supplied with fuel gas containing hydrogen. The hydrogen is subjected to an oxidation reaction according to the following chemical formula (1) to thereby generate proton from the fuel gas. Thus generated proton travels to the cathode electrode through the electrolyte membrane. The cathode electrode is supplied with oxidant gas containing oxygen. The oxygen in the oxidant gas reacts with the proton travelled from the anode electrode to generate water according to a reductive reaction expressed by the following chemical formula (2). As a result, an electrogenic reaction according to the following chemical formula (3) occurs throughout the fuel cell. The fuel cell extracts electric energy from electrodes through an electrochemical reaction occurring on a surface of a side of the electrolyte membrane of the paired electrode structure body.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

As described above, since the fuel cell generates water (Thus generated water is indicated at 30 in FIG. 1.), the generated water within the fuel cell freezes in a cold environment, e.g., below freezing temperature, whereas, the once frozen generated water is defrosted by heat generated at drive of the fuel cell and returns to water again, resulting in causing a possible building-up of water within the fuel cell. If the freezing and building-up of water occurs within the fuel cell, the reactant gas flow channel is blocked to disturb gas diffusion, thereby causing drop in output of the fuel cell. In the light of the above described problem, Japanese Patent Application Publication No. 2005-44795 discusses a method for improving power generation characteristics by controlling pressure of a reactant gas supplied to a fuel cell stack upon actuation thereof below freezing temperature to a value slightly higher than pressure upon normal driving. Increase of a supply pressure of the reactant gas forcibly supplies gas to a reaction surface to compensate decrease of the gas diffusion.

RELATED ART DOCUMENTS

Patent Document

Patent Document 1: Japanese Patent Application Publication No. 2005-44795

SUMMARY OF THE INVENTION

Problem to be Solved by the Invention

Patent Document 1 discusses a technique in which decrease of gas diffusion is controlled by supplying reactant gas more than that supplied during normal driving to thereby enable a sufficient gas to be supplied to a reactant surface. The technique produces an effect in a case where a temperature of the fuel cell is below freezing temperature. However, in a case where frozen ice is defrosted when the temperature of the fuel cell exceeds 0 degree so that rapid water generation results, thus generated water blocks a gas flow channel to disturb smooth drainage of the generated water. As a result, an amount of gas to be supplied to the reactant surface may decrease. Further, the ice within the fuel cell upon actuation below freezing temperature exists not only in the gas flow channel but also within a membrane-electrode assembly as well as within a catalyst layer. Such ice is all defrosted at the same time when the temperature of the fuel cell exceeds 0 degree, so that a drastic drop in output occurs. In the technique of the patent document 1, the increase of supply pressure of the reactant gas enables drainage of the generated water around a gas inlet to some degree. However, with the technique of the patent document 1, it is difficult to achieve adequate drainage of the generated water from an inside of the fuel cell, especially, from an inside of the membrane-electrode assembly and an inside of the catalyst layer, and the drainage from a whole of the fuel cell including a region around a gas outlet. If the generated water builds up within the membrane-electrode assembly and the catalyst layer, thus built-up water disturbs a supply of the reactant gas and inhibits a fuel cell reaction to suppress a rise in temperature of the fuel cell. The suppression of the rise in temperature of the fuel cell decreases evaporation and flow efficiency of the generated water, so that diffusion of the reactant gas is disturbed and a power generation reaction of the fuel cell is disturbed. In other words, if the fuel cell is at low temperature and the generated water builds up within the membrane-electrode assembly and the catalyst layer, a vicious cycle is caused between the gas diffusion and the temperature of the fuel cell. Such vicious cycle may disturb power generation reaction of the fuel cell to thereby induce a drop in output.

The present invention is directed to provide a fuel cell system capable of smoothly draining water resulting from frozen ice defrosted in the fuel cell actuated in a cold environment, thereby improving an output of the fuel cell, and a method for controlling the fuel cell system.

Means for Solving the Problem

According to the present invention, a fuel cell system including a fuel cell stack that generates electricity by supplying fuel gas to an anode electrode and oxidant gas to a cathode electrode is characterized by including a temperature sensor that measures a temperature within the fuel cell stack, a pressure sensor that measures pressure of the cathode electrode, a pressure regulator that regulates pressure of the cathode electrode, and a pressure control unit that controls the pressure regulator so as to apply pulsation to the pressure of the cathode electrode when the temperature within the fuel cell stack measured by the temperature sensor after actuation of the fuel cell system below freezing temperature becomes greater than 0 degree.

According to the fuel cell system having the above described structure, when the water frozen within the fuel cell is defrosted after the actuation thereof below freezing temperature, application of pulsation to the pressure of a side of the cathode electrode enables effective drainage of the built-up water. Since a gas flow can be generated utilizing a pressure gradient instead of simply making the gas flow, the water built-up within the gas flow channel as well as the water blocking the gas flow channel within the membrane-electrode assembly and the catalyst layer can be assuredly drained. Further, since the temperature within the fuel cell rises according to the pressure rise, a warm-up effect of the fuel cell can also be produced. Incidentally, pressure pulsation in the present invention means an instantaneous change of pressure increase/decrease.

In the fuel cell system having the above described structure, it is preferable that the pressure control unit applies pulsation to pressure by controlling the pressure regulator to temporarily raise pressure at the inlet of the cathode electrode and then, lowering the pressure but not to less than a reference pressure value.

Increase/decrease of the pressure at the inlet of the cathode electrode enables prior drainage of the water built-up around the inlet and, therefore, the amount of gas supplied to the cathode electrode can be increased. Further, since the pressure pulsation is applied at or above the reference pressure value, the drop in output can be suppressed even when the pressure is decreased.

In a case where the fuel cell system further includes an output measuring device that measures an output of the fuel cell stack and a determination is made that an output of the fuel cell stack measured by the output measuring device is equal to or less than a required output value, it is preferable that the pressure control unit controls the pressure regulator. Incidentally, the required output value means an output value required for driving and can be set to any value.

After the actuation below freezing temperature, the water within the fuel cell can be effectively drained and the drop in output caused by an excessive application of the pressure pulsation can be suppressed by applying the pressure pulsation only when the output drops due to defrosting of the frozen water and by applying a minimum pulsation essential for recovering the output. Accordingly, a pressure condition and a gas flow condition after carrying out the pressure pulsation can be stabilized promptly.

According to the present invention, a method for controlling a fuel cell system including a fuel cell that generates electricity by supplying fuel gas to an anode electrode and oxidant gas to a cathode electrode is characterized by including determining whether a temperature of the fuel cell is equal to or less than a reference temperature below freezing temperature upon actuation thereof, executing a control of actuation below freezing temperature when the temperature of the fuel cell is equal to or less than the reference temperature, determining whether the temperature of the fuel cell after the execution of the control of actuation below freezing temperature becomes greater than 0 degree, and applying pulsation to pressure of the cathode electrode of the fuel cell when the temperature of the fuel cell after the execution of the control of actuation below freezing temperature becomes greater than 0 degree.

Further, the control method further includes comparing an output value of the fuel cell with a predetermined output required value when the temperature of the fuel cell after the execution of the control of actuation below freezing temperature becomes greater than 0 degree and calculating a pressure variation range from a difference between the output value and the output required value when the output value of the fuel cell is lower than the output required value, wherein it is preferred that, in applying the pulsation to the pressure of the cathode electrode, the pulsation is applied to the pressure of the cathode electrode based on the calculated pressure variation range.

According to the method for controlling the fuel cell system having the above described structure, the water built-up within the fuel cell can be drained by applying the pressure pulsation to the cathode electrode when after the control of actuation below freezing temperature performed for actuation below freezing temperature, it is determined that ice is defrosted.

Effect of the Invention

In a fuel cell actuated under cold environment, the present invention can provide a fuel cell system capable of improving an output of the fuel cell by smoothly draining water resulting from the defrosted ice and a method for controlling the fuel cell system.

MODES FOR CARRYING OUT THE INVENTION

Figure 1:
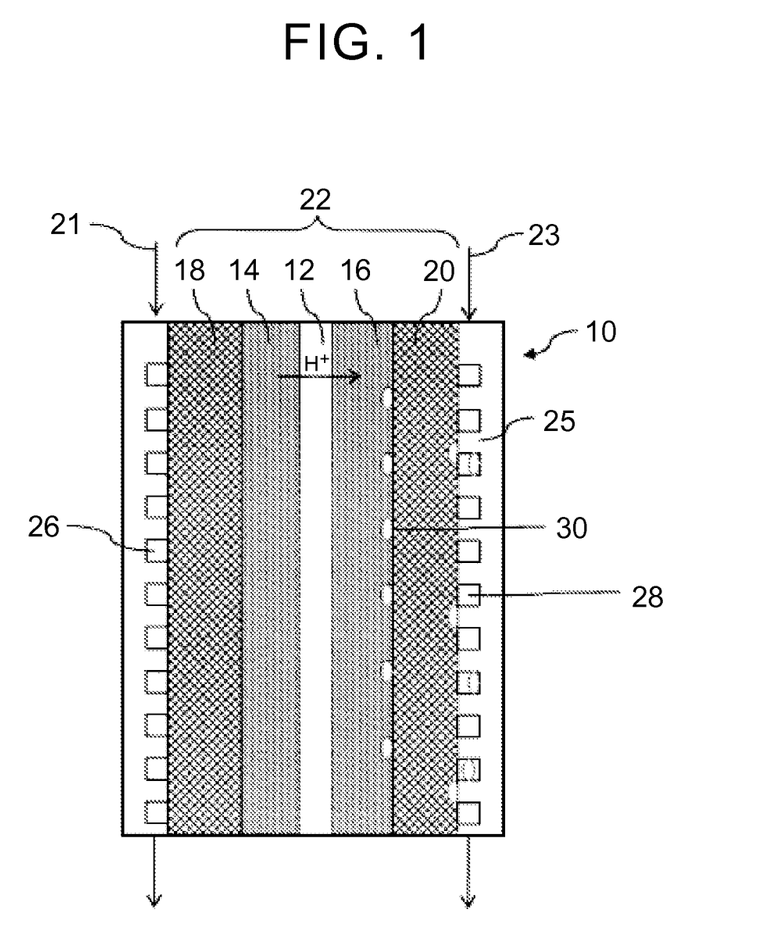
FIG. 1 illustrates a fuel cell in an exemplary embodiment of the present invention.

An exemplary embodiment of the present invention is described below with reference to FIGS. 1 through 3. FIG. 1 illustrates a fuel cell 10. The fuel cell 10 includes an electrolyte membrane 12, an anode catalyst layer 14, a cathode catalyst layer 16, an anode diffusion layer 18, and a cathode diffusion layer 20. The electrolyte membrane 12 includes an ion exchange membrane and has proton conductivity. The anode catalyst layer 14 and the cathode catalyst layer 16 are disposed respective sides of the electrolyte membrane 12. The anode diffusion layer 18 is disposed on the opposite side of the anode catalyst layer 14 from the electrolyte membrane 12 and the cathode diffusion layer 20 is disposed on the opposite side of the cathode catalyst layer 16 from the electrolyte membrane 12. Accordingly, a membrane electrode assembly 22 is formed. Each side of the membrane electrode assembly 22 is provided with a separator 25 to form the fuel cell 10. A plurality of fuel cells 10 is layered to form a fuel cell stack 1. The fuel gas supplied from the outside of the cell 10 is supplied to the anode diffusion layer 18 and the anode catalyst layer 14 via a fuel gas flow channel 26. The oxidant gas is supplied to the cathode diffusion layer 20 and the cathode catalyst layer 16 via an oxidant gas flow channel 28.

Figure 2:
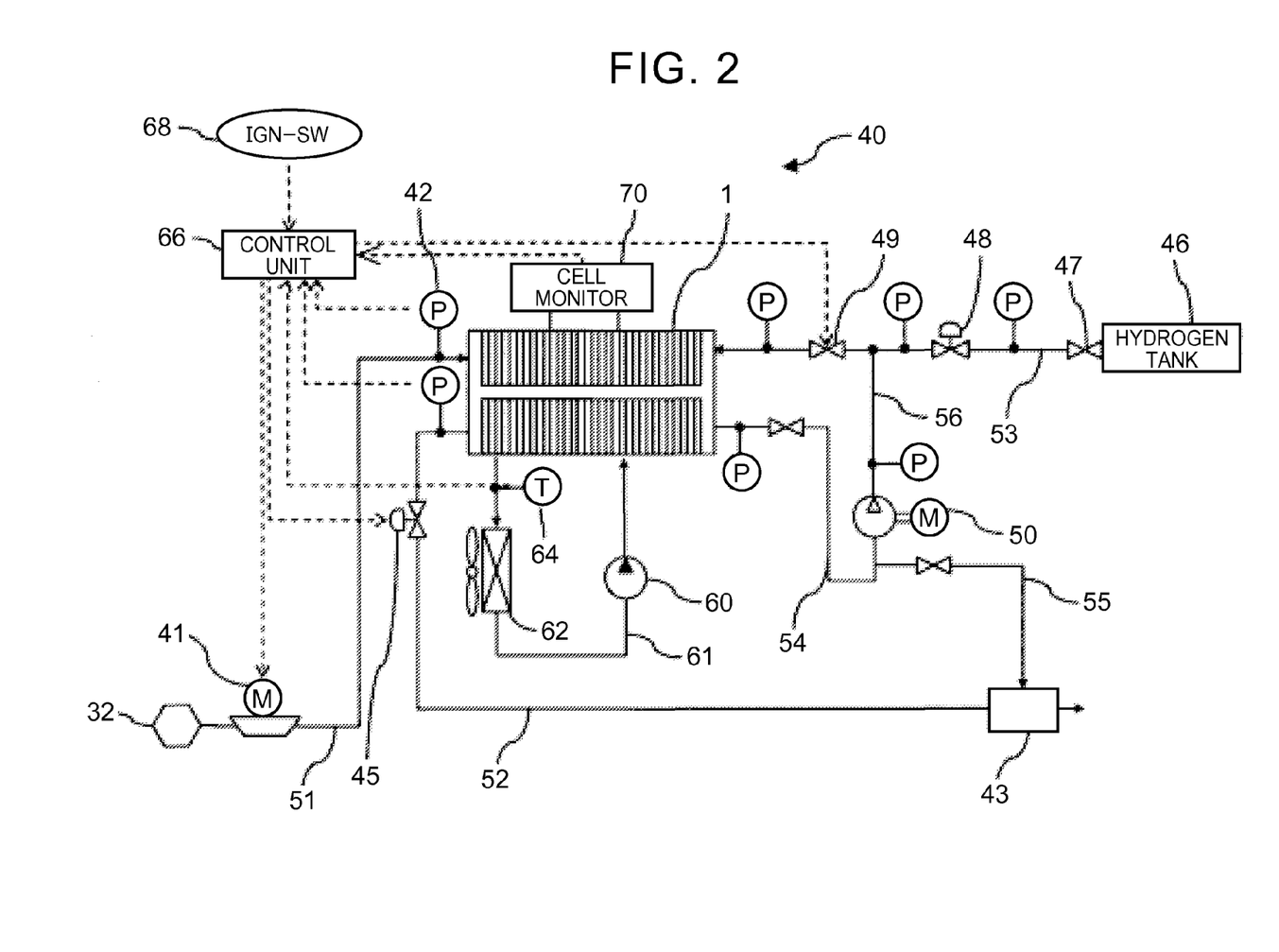
FIG. 2 illustrates a configuration of a fuel cell system in the exemplary embodiment of the present invention.
Figure 3:
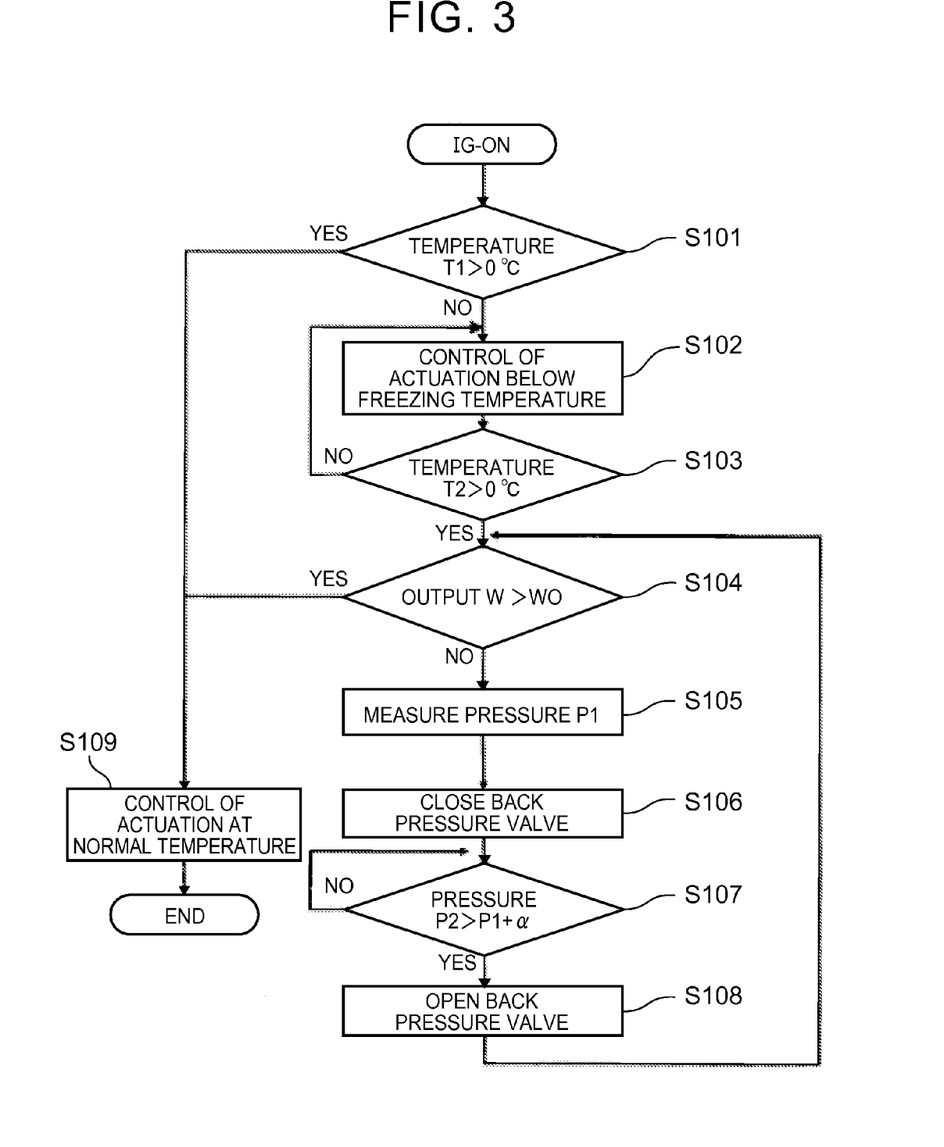
FIG. 3 is a flow chart illustrating drive control processing for supplying oxidant gas in the fuel cell system illustrated in FIG. 2.

FIG. 2 illustrates a configuration of the fuel cell system in the exemplary embodiment of the present invention. In a fuel cell system 40, the cathode electrode (i.e., a cathode-side chamber of the fuel cell) of the fuel cell stack 1 is supplied with a compressed air as the oxidant gas. More specifically, the air sucked through a filter 32 is compressed by a compressor 41 before supplied to the fuel cell stack 1 via a pipe 51. Supply air pressure is detected by a pressure sensor 42 to be controlled to a predetermined reference pressure, e.g., 150 kPa. Air from the cathode electrode (i.e., a cathode-side chamber of the fuel cell) is exhausted to the outside via a pipe 52 and a diluter 43. The supply air pressure is detected by the pressure sensor 42 provided on the pipe 51 and adjusted by a back pressure valve 45. As the back pressure valve 45 is opened wider, the outlet pressure decreases more. That is, a differential pressure occurs between the inlet pressure and the outlet pressure.

The anode electrode of the fuel cell stack 1 is supplied with hydrogen gas stored in a hydrogen tank 46 via a pipe 53. The hydrogen gas stored in the hydrogen tank 46 at high pressure is supplied to the anode electrode after pressure of the hydrogen gas and an amount of the hydrogen gas to be supplied is adjusted by a shut valve 47, a regulator 48, and a valve 49 at an outlet of the hydrogen tank. Exhaust from the anode electrode drains into a pipe 54 to be divided into 2 streams. One stream is led into a pipe 55 and the diluter 43 for exhausting the hydrogen gas to the outside after diluting the hydrogen gas with the air. The other stream is led into a pipe 56 via a booster pump 50 to be circulated to the fuel cell stack 1 again.

A coolant for cooling the fuel cell stack 1 flows through a cooling pipe 61 by means of a pump 60 and is cooled by a radiator 62 to be supplied to the fuel cell stack 1. An outlet of the coolant of the fuel cell stack 1 is provided with a temperature sensor 64 for detecting a temperature of the coolant. The coolant circulates through the fuel cell stack 1, so that the temperature of the coolant measured by the temperature sensor 64 can be used as a temperature of the fuel cell. Incidentally, the temperature of the fuel cell may be detected by, for example, the temperature sensor directly mounted to the fuel cell stack.

The fuel cell system 40 is provided with a control unit (ECU) 66 for controlling the fuel cell system 40. The control unit 66 receives detection signals from, for example, the pressure sensor 42 and the temperature sensor 64 and supplies control signals to, for example, the back pressure valve 45, the valve 49, and the compressor 41. A voltage value and a current value detected by a cell monitor 70 are also input to the control unit 66. Further, the control unit 66 is connected with an ignition switch 68 from which a signal of an ignition ON/OFF is input. Some of the signals input into/output from the control unit 66 are illustrated with a dotted line in the drawing.

Now, a method for controlling the fuel cell system is described with reference to FIG. 3. FIG. 3 is a flow chart illustrating control processing performed by the fuel cell system of FIG. 2. First, when the ignition switch 68 is switched from OFF to ON, a start-up signal is input (IG-ON) and the processing proceeds to step S101.

In step S101, a temperature T1 in the fuel cell stack 1 is measured by the temperature sensor 64 and input to the control unit 66. The control unit 66 determines whether or not the temperature T1 is equal to or greater than 0 degree. In a case where the temperature T1 is greater than 0 degree, the processing proceeds to step S109 where a control of actuation at normal temperature is carried out. In a case where the temperature T1 is equal to or smaller than 0 degree, the processing proceeds to step S102 where a control of actuation below freezing temperature is carried out.

Now, the control of actuation below freezing temperature is described. It is publicly known that, the control of actuation below freezing temperature provides actuation with the fuel cell stack raised in temperature, while generating power at lower efficiency than power generation under the control of actuation at normal temperature. In the low-efficiency power generation, the amount of reactant gas, more specifically, the amount of oxidant gas, supplied to the fuel cell is less than the amount of oxidant gas supplied in the normal power generation, so that power loss is large. For example, the fuel cell is driven under a condition that an air stoichiometric ratio is narrowed down in the vicinity of 1.0 in comparison with a ratio for the control of actuation at normal temperature. Thus, setting of a large power loss enables a rapid warm-up of the fuel cell. Incidentally, in the control of actuation at normal temperature, the fuel cell is driven under a condition that the air stoichiometric ratio is set to, for example, a value equal to or greater than 1.5 in order to obtain high power generation efficiency while suppressing the power loss.

Figure 6:
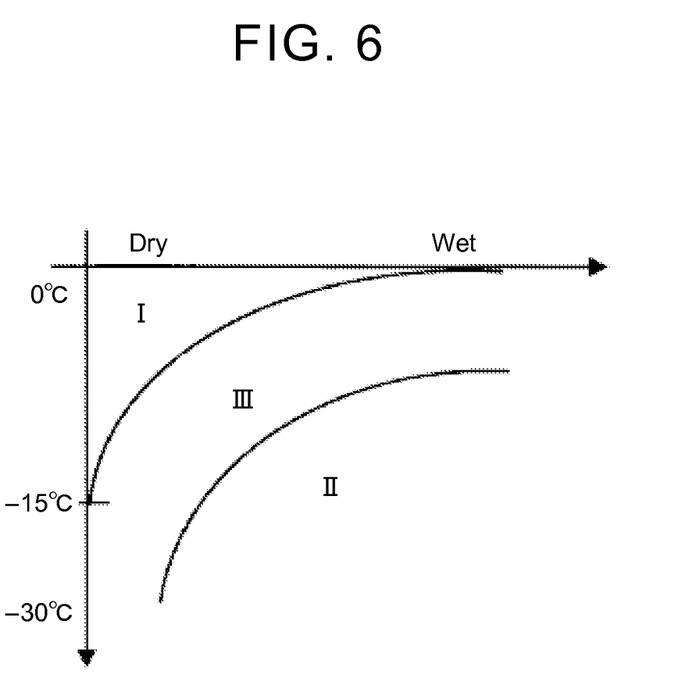
FIG. 6 illustrates a control map upon a control of actuation below freezing temperature.

The control of actuation below freezing temperature is achieved by various methods. A specific example thereof is described below. A condition of the fuel cell is classified into 3 states based on a relationship between the temperature of the fuel cell and the amount of water remaining in the fuel cell upon actuation of the fuel cell and the control is performed according to any one of the 3 states. FIG. 6 is a graph illustrating that the condition of the fuel cell is classified into 3 states based on the relationship between the temperature of the fuel cell and the amount of water remaining in the fuel cell upon actuation of the fuel cell. Based on the map, the control is performed according to any one of the 3 states which include: (I) a state where a temperature of the fuel cell is high and an amount of residual water is small; (II) a state where a temperature of the fuel cell is low and an amount of residual water is large; and (III) a state other than the above, i.e., a state where a temperature of the fuel cell is low and an amount of residual water is small and a state where a temperature of the fuel cell is high and an amount of residual water is large. In the state where the temperature of the fuel cell is high and the amount of residual water is small (I), the rapid warm-up is carry out by supplying an increased amount of reactant gas while circulating a coolant. In the state where the temperature of the fuel cell is low and the amount of residual water is large (II), the rapid warm-up is carry out by supplying a decreased amount of reactant gas without circulating the coolant. In the state where the temperature of the fuel cell is low and the amount of residual water is large and in the state where the temperature of the fuel cell is high and the amount of residual water is small (III), the rapid warm-up is carried out while circulating the coolant and reactant gas. As described above, the fuel cell can be smoothly actuated by varying the amount of circulated coolant in the light of a balance between the temperature of the fuel cell stack and the amount of water remaining in the fuel cell stack.

After carrying out the control of actuation below freezing temperature in step S102, the processing proceeds to step S103 where the temperature sensor 64 measures a temperature T2 in the fuel cell stack 1 again. Similar to step S101, thus measured temperature T2 is input to the control unit 66 which determines whether or not the temperature T2 is equal to or greater than 0 degree. When the temperature T2 is greater than 0 degree, the processing proceeds to step S104. When the temperature T2 is equal to or less than 0 degree, the processing returns to step S102 where the control of actuation below freezing temperature is repeated. In other words, the control of actuation below freezing temperature of step S102 is performed until the temperature T2 of the fuel cell stack 1 exceeds 0 degree, and, when the temperature T2 exceeds 0 degree, the control of actuation below freezing temperature is terminated.

In step S104, the control unit 66 calculates an output value W based on a pressure value V and a current value I detected by the cell monitor 70 and determines whether or not the output value W is larger than a required output value WO. In other words, whether or not sufficient power generation is performed by each of the fuel cells in the fuel cell stack 1 is determined from the output. In a case where the output value W is larger than the required output value WO, the control unit 66 determines that the sufficient power generation is performed and the processing proceeds to step S109 where the control is switched to the control of actuation at normal temperature. On the other hand, in a case where the output value W is equal to or less than the required output value WO, the control unit 66 determines that water is generated because the temperature exceeds 0 degree and the water remains within the fuel cell. Accordingly, the processing proceeds to step S105. The required output value WO can be freely set and is set to an output value which is provided when the cell is in a state to be smoothly switched from low-temperature start control to normal-temperature start control. In the fuel cell stack 1 according to the present exemplary embodiment, the required output value is set to, for example, 1.5 kW.

In step S105, the pressure sensor 42 measures a pressure P1 at the inlet of the cathode electrode and inputs the measured pressure P1 to the control unit 66.

In step S106, the control unit 66 closes the back pressure valve 45 for adjusting the pressure at an outlet of the cathode electrode to raise the pressure of the cathode electrode.

In step S107, the pressure sensor measures a pressure P2 at the inlet of the cathode electrode after the valve is closed and inputs the measured pressure P2 to the control unit 66. The control unit 66 compares a pressure P1 before closing the valve, a pressure P2 after closing the valve, and a pressure variation range α and determines whether or not the comparison result satisfies P2>P1+α. In other words, the control unit 66 determines whether or not the pressure P2 rises from the pressure P1 before closing the valve by α kPa. If P2>P1+α is satisfied, the processing proceeds to step S108. If P2>P1+α is not satisfied, the processing of step S107 is repeated until P2>P1+α is satisfied. Here, α can be set to any value. Since α varies depending on, for example, a configuration of the fuel cell stack 1, it is preferable to perform a test on the fuel cell stack 1 so as to determine a suitable value.

Figure 4:
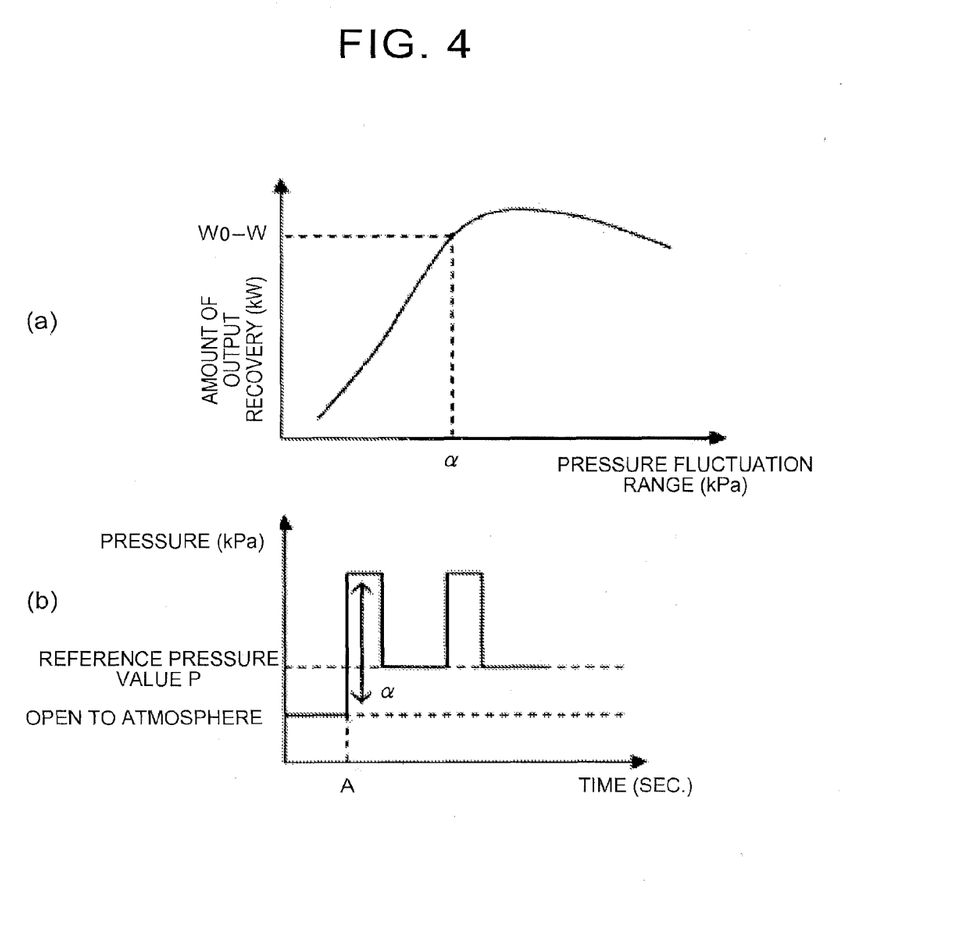
FIG. 4 illustrates a relationship between pressure fluctuation and output recovery.

Further, as illustrated in FIG. 4(a), it is possible to preliminary measure a the pressure variation range α and an amount of output recovery to determine a relationship therebetween and make a map thereof and to calculate a required pressure variation range α from a shortage of output (W0−W) and the map. That is, an effective drainage of water is achieved by increasing the pressure variation range α when the shortage of the output is large.

In step S108, the control unit 66 opens the back pressure valve 45 to release the pressure of the cathode electrode. At this time, the control unit 66 controls the back pressure valve 45 such that the pressure of the cathode electrode may not drop to a value equal to or less than a reference pressure value P. In other words, the control unit 66 applies pressure pulsation to the cathode electrode by opening/closing the back pressure valve 45 while maintaining the pressure of the cathode electrode equal to or greater than a reference pressure value P. Incidentally, the reference pressure value P indicates a pressure value required for supplying a certain amount of reactant gas to the fuel cell. The reference pressure value P can be set to any value.

As illustrated in the drawing, a pressure sensor is provided at the outlet of the cathode electrode of the fuel cell stack 1 such that the control unit 66 may control the opening of the back pressure valve 45 in a manner to keep the pressure at the outlet of the cathode electrode higher than the reference pressure value P. It is noted that the valve is preferably opened quick enough to impart a predetermined pulsation to the gas pressure in the cathode electrode.

Here, if the amount of residual water is large, it is required to impart the largest possible pressure change for the output recovery. However, the gas pressure in the cathode electrode cannot be raised too high. Therefore, in order to obtain a large pressure variation range, the reference pressure value P as a lower limit pressure is set to a relatively low value. A sufficient amount of reactant gas is necessary for inducing a sufficient reaction in the fuel cell and hence, it is preferred to impart a relatively high pressure to the reaction gas.

Therefore, a pressure variation range required for recovering the output is calculated. If the required pressure variation range is large, the pressure variation range is enlarged by using a high upper pressure limit and a low lower pressure limit. If the pressure variation range required for output is relatively small, it is suitable to increase the reference pressure value P and to reduce the pressure variation range. Further, when the pressure variation range required for output is relatively small, the upper pressure limit may be lowered and the lower pressure limit may be raised.

As described above, when applying the pulsation to the cathode electrode, decrease of the amount of the reactant gas is suppressed, whereby a sufficient reaction in the cathode electrode can be maintained.

In the system as the subject, how much the pressure increases when closing the back pressure valve 45 can be estimated by performing, for example, a test. Therefore, the processing in step S107 can be substituted by processing to determine whether a certain period of time has elapsed after the closure of the valve.

In any way, the water built up in the cathode electrode can be effectively drained by periodically closing and opening the back pressure valve 45 and periodically increasing or decreasing the pressure in the cathode electrode.

FIG. 4(b) illustrates how the pressure varies during a period between step S106 and step S108. The pressure is increased in step S106 by closing the back pressure valve 45 which is open to the atmosphere before closure. After the pressure is increased by the pressure variation range αkPa, the pressure is decreased by opening the back pressure valve 45 in step S108. At this time, it is preferable to decrease the pressure to the extent that the pressure is not lowered to below the reference pressure value P. In a case where, after the fuel cell system is actuated below freezing temperature and the pressure is decreased to a value equal to or less than the reference pressure value P when the temperature exceeds 0 degree, the output recovery is insufficient because the amount of reactant gas within the cell decreases and performance degradation may result. The application of the pulsation to the pressure such that the pressure would not get below the reference pressure value P. Even when the pressure drops, an effective recovery of the output can be achieved by applying pulsation to the pressure to maintain the pressure at least at the reference pressure P.

After carrying out the output recovery control in step S105 through step S108, the processing returns to step S104. In a case where the output value W does not satisfy the required output value WO, the output recovery control (i.e., step S105 through step S108) is repeated. When the output W exceeds the required output value WO in step S104, the processing proceeds to step S109 where the control of actuation at normal temperature is performed.

Figure 5:
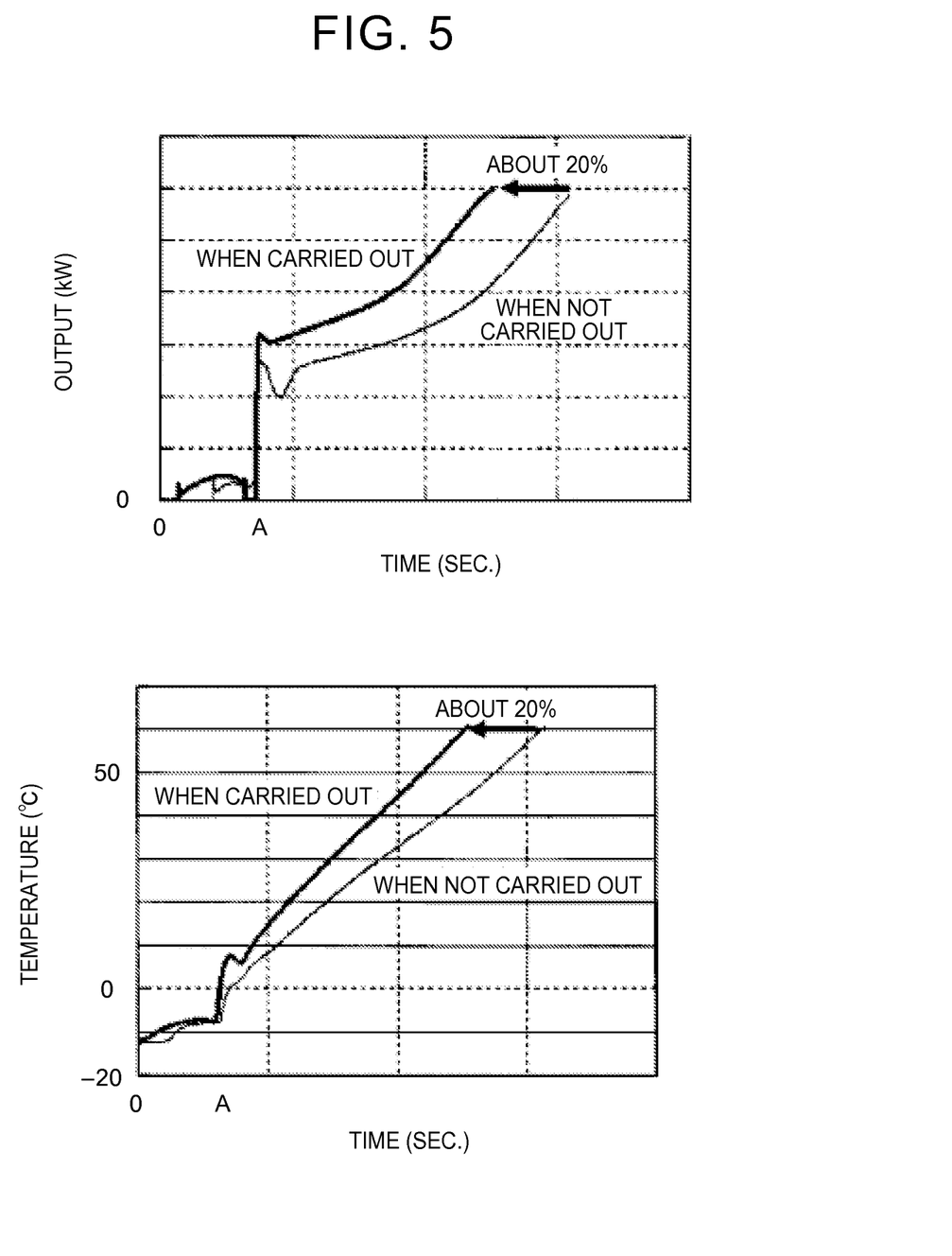
FIG. 5 includes a graph illustrating the power variation caused by a pressure pulsation and a graph illustrating temperature fluctuation caused by a pressure pulsation.

FIG. 5 includes graphs illustrating the output value and the temperature of the fuel cell which are compared between a case where the control method of the fuel cell system according to the exemplary embodiment of the present invention is performed in an arrangement equipped with the fuel cell system according to the exemplary embodiment of the invention, and a case where the above control method is not performed. After the lapse of 'A' seconds from the actuation below freezing temperature, the temperature of the fuel cell exceeds 0 degree. In a case where the output value W of the fuel cell is equal to or less than the required output value WO at this time, the above described output recovery control is carried out (i.e., step S105 through step S108 in FIG. 3). It is found that, in a case where the control of the present invention is carried out after the lapse of 'A' seconds, the output and the temperature increases more rapidly than a case where the control of the present invention is not carried out and that the subsequent recovery is remarkably improved. It is confirmed that an output increase time and a temperature rise time can be shortened by about 20% by carrying out the control according to the present exemplary embodiment (one cycle of the output recovery control from step S105 through step S108), in comparison to the case where the above control is not carried out.

In an exemplary modification, it is also possible to change the compression ratio of air by adjusting the compressor 41 when changing the pressure of the cathode electrode in step S106 through step S108. Similarly to the closing/opening of the back pressure valve 45, the pressure pulsation can be applied to the cathode electrode by changing the number of rotations of the compressor 41 thereby causing rapid increase or decrease of the flow rate of the oxidant gas after the temperature exceeds 0 degree. Thus are obtained effects to enhance water drainage performance, to increase output and to raise the temperature of the fuel cell. It is also possible to raise the pressure at the inlet of the cathode electrode by controlling the compressor 41 together with the back pressure valve 45. The pressure pulsation can be applied more effectively by adjusting the amount of pressure increase/decrease, the pressure increase/decrease time, and the timing of increasing/decreasing the pressure at the inlet and the outlet of the cathode electrode, thereby improving the output, the drainage performance, and the temperature performance.

According to the fuel cell system and the method for controlling the fuel cell system according to the present exemplary embodiment, water frozen in the fuel cell at the time of actuation below freezing temperature can be smoothly drained as soon as it is defrosted. By increasing/decreasing the pressure to apply the pulsation when the temperature exceeds 0 degree, the gas flow can be effectively generated utilizing the pressure gradient instead of simply making the gas flow. Accordingly, the water built up in the gas flow channel as well as the water built up in the catalyst layer and the diffusion layer and blocking the gas flow channel can be assuredly drained. The temperature in the fuel cell rises according to the increase of the gas pressure, so that the warm-up effect can also be produced. The present invention offers the effect to improve the drainage performance, the cell temperature, and the output not only during the pressure pulsation but also during the subsequent operation of the fuel cell, permitting quick performance recovery.

DESCRIPTION OF REFERENCE NUMERALS

1 FUEL CELL STACK
10 FUEL CELL
12 ELECTROLYTE MEMBRANE
14 ANODE CATALYST LAYER
16 CATHODE CATALYST LAYER
18 ANODE DIFFUSION LAYER
20 CATHODE DIFFUSION LAYER
21, 23 ARROW
22 MEMBRANE ELECTRODE ASSEMBLY
25 SEPARATOR
26 FUEL GAS FLOW CHANNEL
28 OXIDANT GAS FLOW CHANNEL
30 GENERATED WATER
32 FILTER
40 FUEL CELL SYSTEM
41 COMPRESSOR
42 PRESSURE SENSOR
43 DILUTER
45 BACK PRESSURE VALVE
46 HYDROGEN TANK
47 SHUT VALVE
48 REGULATOR
49 VALVE
50 PRESSURE PUMP
51, 52, 53, 54, 55, 56 PIPE
60 PUMP
62 RADIATOR
64 TEMPERATURE SENSOR
66 CONTROL UNIT
68 IGNITION SWITCH
70 CELL MONITOR

What is claimed is:

1. A fuel cell system comprising a fuel cell stack that generates electricity by supplying fuel gas to an anode electrode and oxidant gas to a cathode electrode, the fuel cell system comprising:
    a temperature sensor configured to measure a temperature in the fuel cell stack;
    a pressure sensor configured to measure pressure of the cathode electrode;
    a pressure regulator configured to regulate the pressure of the cathode electrode; and
    a pressure control unit configured to control the pressure regulator so as to apply pulsation to the pressure of the cathode electrode when the temperature in the fuel cell stack measured by the temperature sensor after actuation below freezing temperature exceeds 0 degree.

2. The fuel cell system according to claim 1, wherein the pressure control unit is configured to apply pulsation to pressure by controlling the pressure regulator to temporarily raise pressure at an inlet of the cathode electrode and then, lowering the pressure but not to less than a reference pressure value.

3. The fuel cell system according to claim 1, further comprising
    an output measuring device configured to measure an output of the fuel cell stack;
    wherein the pressure control unit is configured to control the pressure regulator when the output of the fuel cell stack measured by the output measuring device is determined as a value equal to or less than a required output value.

4. The fuel cell system according to claim 1, further comprising:
    a pressure calculation unit configured to calculate a pressure variation range required in recovering the output based on an output value and a required power value of the fuel cell;

wherein the pressure control unit is configured to control the pressure regulator based on the pressure variation width calculated by the pressure calculation unit.

5. A method for controlling a fuel cell system comprising a fuel cell that generates electricity by supplying fuel gas to an anode electrode and oxidant gas to a cathode electrode, the method comprising:
- determining whether a temperature of the fuel cell upon actuation is equal to or less than a reference temperature below freezing temperature;
- executing a control of actuation below freezing temperature when the temperature of the fuel cell is equal to or less than the reference temperature;
- determining whether the temperature of the fuel cell after the execution of the control of actuation below freezing temperature exceeds 0degree; and
- applying pulsation to pressure of the cathode electrode of the fuel cell when the temperature of the fuel cell after the execution of the control of actuation below freezing temperature exceeds 0 degree.

6. The method for controlling the fuel cell system according to claim 5, further comprising:
- comparing an output value of the fuel cell with a predetermined output required value when the temperature of the fuel cell after the execution of the control of actuation below freezing temperature exceeds 0 degree; and
- calculating a pressure variation range from a difference between the output value and the output required value when the output value of the fuel cell is lower than the output required value;
- wherein, in applying the pulsation to the pressure of the cathode electrode, the pulsation is applied to the pressure of the cathode electrode based on the calculated pressure variation range.

* * * * *